(12) United States Patent
Border et al.

(10) Patent No.: US 7,609,958 B2
(45) Date of Patent: Oct. 27, 2009

(54) AUTOMATIC FOCUS SYSTEM CALIBRATION FOR IMAGE CAPTURE SYSTEMS

(75) Inventors: John N. Border, Walworth, NY (US); Dan Harel, Rochester, NY (US); Russell J. Palum, Rochester, NY (US); John D. Griffith, Rochester, NY (US); Scott C. Cahall, Fairport, NY (US); Bruce H. Pillman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 530 days.

(21) Appl. No.: 11/496,913

(22) Filed: Aug. 1, 2006

(65) Prior Publication Data

US 2008/0031610 A1    Feb. 7, 2008

(51) Int. Cl.
    *G03B 3/00*    (2006.01)
    *G03B 21/00*    (2006.01)
(52) U.S. Cl. .......................... 396/89; 396/104; 396/123; 396/430; 348/348; 353/69
(58) Field of Classification Search .................. 396/89, 396/123, 429, 430, 97, 102, 104, 121, 94; 348/187, 348, 189; 353/69
See application file for complete search history.

(56) References Cited

U.S. PATENT DOCUMENTS

| | | |
|---|---|---|
| 4,862,278 A | 8/1989 | Dann et al. |
| 5,164,831 A | 11/1992 | Kuchta et al. |
| 5,371,691 A * | 12/1994 | Seki et al. ................... 396/104 |
| 5,440,369 A | 8/1995 | Tabata et al. |
| 5,715,483 A | 2/1998 | Omata et al. |
| 5,877,809 A | 3/1999 | Omata et al. |
| 6,067,114 A | 5/2000 | Omata et al. |

(Continued)

FOREIGN PATENT DOCUMENTS

EP     1 434 427 A2     4/2002

(Continued)

OTHER PUBLICATIONS

Light Blue Optics, Ltd., "PVPro™Enabling Personal Video Projectors", www.lightblueoptics.com.

(Continued)

*Primary Examiner*—Christopher E Mahoney
*Assistant Examiner*—Noam Reisner
(74) *Attorney, Agent, or Firm*—Roland R. Schindler

(57) ABSTRACT

Imaging systems and methods for calibrating imaging systems are provided. The imaging system has a body, a scene image capture system that captures images using a taking lens system that can be set to a plurality of different focus distances, and a rangefinder that is capable of determining a distance between the imaging system and at least one portion of a field of view of the taking lens system. The method comprises: automatically capturing a first calibration image of a first field of view through the taking lens system with the taking lens system set to a first focus distance setting; identifying a portion of the first calibration image having a predetermined degree of focus; using the rangefinder to determine a first calibration distance from the imaging device to the identified portion. A focus correlation is determined based upon the first calibration distance and the first focus distance setting.

20 Claims, 13 Drawing Sheets

U.S. PATENT DOCUMENTS

| | | |
|---|---|---|
| 6,381,413 B1 | 4/2002 | Harada |
| 6,637,896 B2 | 10/2003 | Li et al. |
| 6,796,655 B2 | 9/2004 | Seki |
| 6,854,474 B1 | 2/2005 | Chen |
| 6,864,474 B2 * | 3/2005 | Misawa .................. 250/201.4 |
| 6,970,646 B2 * | 11/2005 | Hirai ........................... 396/91 |
| 6,984,039 B2 | 1/2006 | Agostinelli |
| 7,536,093 B2 * | 5/2009 | Kita ............................. 396/72 |
| 7,536,094 B2 * | 5/2009 | Ichimiya ..................... 396/89 |
| 2002/0118151 A1 | 8/2002 | Chen |
| 2002/0176015 A1 | 11/2002 | Lichtfuss |
| 2003/0081184 A1 | 5/2003 | Li et al. |
| 2005/0024606 A1 | 2/2005 | Li et al. |
| 2005/0168705 A1 | 8/2005 | Li et al. |
| 2006/0061676 A1 | 3/2006 | Suda |

FOREIGN PATENT DOCUMENTS

| | | |
|---|---|---|
| GB | 2 377 580 | 1/2003 |
| WO | WO 03/038517 | 5/2003 |

OTHER PUBLICATIONS

Jacqueline Hewett, "Tiny Image Projectors Take a Step Towards the Shops", Jul./Aug. 2003, www.optics.org.

Anne Eisenberg, "What's Next; For Your Viewing Pleasure, a Projector in Your Pocket", Nov. 4, 2004, www.nytimes.com.

* cited by examiner

| Rangefinder Distance | Lens Setting |
|---|---|
| 0 TO 0.5 Meters | 1 |
| 0.51- 75 Meters | 2 |
| 0.76-1.0 Meters | 3 |
| 1.0- 1.3 meters | 4 |
| 1.3 - 1.7 Meters | 5 |
| 1.71-2.11 Meters | 6 |
| 2.11-2.6 Meters | 7 |
| 2.6 - 3.5 Meters | 8 |
| 3.5 - 7.0 Meters | 9 |
| 7.0 - Inf. Meters | 10 |

FIG. 6

| Rangefinder Distance | Lens Setting |
|---|---|
| 0 TO 0.4 Meters | 1 |
| 0.41- 0.65 Meters | 2 |
| 0.66-0.9 Meters | 3 |
| .91- 1.3 meters | 4 |
| 1.3 - 1.7 Meters | 5 |
| 1.71-2.11 Meters | 6 |
| 2.11-2.6 Meters | 7 |
| 2.6 - 3.5 Meters | 8 |
| 3.5 - 7.0 Meters. | 9 |
| 7.0 - Inf. Meters | 10 |

FIG. 7

| Rangefinder Distance | Lens Setting |
|---|---|
| 0 TO 0.3 Meters | 1 |
| 0.31- 0.55 Meters | 2 |
| 0.55-0.65 Meters | 3 |
| .65- 1.00 meters | 4 |
| 1.01 - 1.8 Meters | 5 |
| 1.81-2.11 Meters | 6 |
| 2.11-2.6 Meters | 7 |
| 2.6 - 3.5 Meters | 8 |
| 3.5 - 7.0 Meters. | 9 |
| 7.0 - Inf. Meters | 10 |

FIG. 8

| Rangefinder Distance | Lens Setting |
|---|---|
| 0 TO 0.5 Meters | 1 |
| 0.51-.75 Meters | 2 |
| 0.76-1.0 Meters | 3 |
| 1.0- 1.3 meters | 4 |
| 1.3 - 1.7 Meters | 5 |
| 1.71-2.11 Meters | 6 |
| 2.11-2.6 Meters | 7 |
| 2.6 - 3.5 Meters | 8 |
| 3.5 - 7.0 Meters. | 9 |
| 7.0 - Inf. Meters | 10 |

TEMPERATURE - BELOW 9 DEG C

*FIG. 13*

| Rangefinder Distance | Lens Setting |
|---|---|
| 0 TO 0.4 Meters | 1 |
| 0.41- 0.65 Meters | 2 |
| 0.66-0.9 Meters | 3 |
| .91- 1.3 meters | 4 |
| 1.3 - 1.7 Meters | 5 |
| 1.71-2.11 Meters | 6 |
| 2.11-2.6 Meters | 7 |
| 2.6 - 3.5 Meters | 8 |
| 3.5 - 7.0 Meters. | 9 |
| 7.0 - Inf. Meters | 10 |

TEMPERATURE - 10 -29 DEG C

*FIG. 14*

| Rangefinder Distance | Lens Setting |
|---|---|
| 0 TO 0.3 Meters | 1 |
| 0.31- 0.55 Meters | 2 |
| 0.55-0.65 Meters | 3 |
| .65- 1.00 meters | 4 |
| 1.01 - 1.8 Meters | 5 |
| 1.81-2.11 Meters | 6 |
| 2.11-2.6 Meters | 7 |
| 2.6 - 3.5 Meters | 8 |
| 3.5 - 7.0 Meters. | 9 |
| 7.0 - Inf. Meters | 10 |

TEMPERATURE - OVER 30 DEG C

*FIG. 15*

AUTOMATIC FOCUS SYSTEM CALIBRATION FOR IMAGE CAPTURE SYSTEMS

FIELD OF THE INVENTION

The invention relates to automatic calibration of imaging systems to improve image quality and enable faster operation.

BACKGROUND OF THE INVENTION

Imaging systems are limited in terms of image quality by artifacts introduced by the environment that they are operated in. One way to avoid capturing or creating images that have such artifacts is to calibrate the imaging system in an environment that is similar to the environment in which it will be used. Often this is done when the imaging device is manufactured. For example, it is known in the art to use test fixtures to calibrate autofocus systems in film cameras while such cameras are within an operating range of environmental conditions.

In particular, one aspect of an imaging system that benefits from calibration is the autofocus system in an imaging system. Many film cameras, digital cameras and scanners capture images using an imager and a lens system with an adjustable focus lens system. Typically, the focus distance of such an adjustable focus lens system can automatically be set to one of a plurality of different settings by sensing, control and drive systems that are adapted to provide optimal focus of what is determined to be a subject area in a scene. Lens systems that have automatically adjustable focus settings are referred to herein as autofocus systems.

It will be appreciated that it is important to properly calibrate such autofocus systems. In the above example, focus settings for film cameras are calibrated by using the test fixture to monitor an image provided by the lens system of such a film camera and adjusting the lens system until the lens system reaches a first setting where a test target located at a first distance from the camera is in focus. The rangefinder for the film camera is then used to measure the distance to the test target and thereafter the rangefinder will position the lens system at the first setting whenever the rangefinder measures that distance. This process is then repeated for a plurality of other test targets, each located at one of a range of additional distances so that the rangefinding measurements are associated with each of a plurality or lens focus settings.

Digital cameras typically use one of two types of autofocus systems: rangefinder type autofocus systems or a "through-the-lens" type autofocus system to automatically determine taking lens focus settings. A rangefinder autofocus system uses sensors such as optical rangefinders or sonic rangefinders to determine a distance from a camera to one or more portions of a scene within a field of view of the adjustable lens system. Common rangefinder type autofocus systems include active and passive systems. In one example of an active rangefinder type system, the rangefinder type autofocus system compares two low-resolution images that have been captured through two lens systems that are separated laterally by a distance and determine the distance to the scene through triangulation. The focus setting of the adjustable focus lens system is then determined using a calibrated preprogrammed curve or look-up table that correlates scene distances with lens positions that can be used to capture objects at the scene distance in focus. A wide variety of rangefinder type autofocus systems are very well known in the art.

Rangefinder type autofocus systems have the advantage of being very fast with some having a response time that can be in the range of 0.01-0.05 second. However, the focus quality produced by some rangefinder type autofocus systems can vary when they are used in different operating conditions. For example, temperature and humidity can affect the calibration of the distance to focus lens position curve due to fluctuations in the refractive index and dimensions of both the rangefinder autofocus system components and the taking lens components.

The "through-the-lens" autofocus system determines focus settings using analysis of a series of images captured with the lens system positioned at a plurality of different focus distances. For example, in a contrast based "through-the-lens" autofocus system a plurality of different images (e.g. 5-20) are captured with the taking lens in different focus lens positions in a so-called hill climb method. The contrast present in the captured images is compared and the image with the greatest contrast is determined to be the image with the best focus conditions (often the best focus lens position is further refined by interpolating the contrast values between images). The "through-the-lens" type autofocus system is very accurate since it measures focus quality directly from images captured with the high quality taking lens.

However, conventional "through-the-lens" type autofocus systems can be relatively slow in determining a focus setting. For example, such systems can take as long as 0.5-2.0 seconds to determine a focus distance. This is because such "through-the-lens" autofocus systems require the capture and processing of a number of images.

Accordingly, in some digital cameras, the two types of autofocus systems are used together in a hybrid system in which the rangefinder type autofocus system is used to provide a fast estimation of a focus setting that is then followed by the use of the "through-the-lens" autofocus system to refine the focus setting. For example, U.S. Pat. No. 6,864,474 entitled "Focusing Apparatus for Adjusting Focus of an Optical Instrument", filed by Misawa on Jan. 10, 2003, describes the coordinated use of a rangefinder type autofocus system with a through-the-lens autofocus system. In Misawa, the focus position of the taking lens is determined by both the rangefinder based autofocus system and the "through-the-lens" autofocus system, the difference between the focus position determined by the rangefinder type autofocus system and the focus position determined by the "through-the-lens" type autofocus system is stored for future reference. In subsequent image capture episodes, the stored difference information is used to refine the number of images captured and analyzed by the "through-the-lens" type autofocus system in the hill climb method to determine the focus lens position with best focus, thereby reducing the number of images captured and processed when the rangefinder has been accurate and increasing the number of images captured and processed when the rangefinder has been inaccurate. However, the method described by Misawa assumes that the performance of the rangefinder, adjustable focus lens system, and control system are consistent over time, do not fluctuate with variations in environmental conditions and do not otherwise change or drift over time.

Misawa also does not eliminate the use of multiple image capture and processing used by the "through-the-lens" type autofocus system so that the hybrid autofocus as described by Misawa remains slow. A further aspect of an imaging system that would benefit from calibration is a projection system in order to ensure that a projection lens system is properly focused. There have been efforts to provide automatic feedback systems to this end. For example, U.S. Patent Application Publications US2005/0168705 and US2005/0024606 both by Li et al., describe projection systems which include feedback of a projected image by an imaging sensor system. In this case Li et al. teaches the use of the imaging sensor system to aid in focusing the projector. Li et al. also teaches the use of an imaging sensor system to enable the projection system to correct for projector-to-surface orientation problems, such as correcting to adjust for keystone in the projected image, or to fit the projected image within the edge of a projection screen. Thus, Li et al. discloses, essentially, a "through-the-lens" focus system with orientation compensation. However, here again calibration of such a system is typically performed only during manufacturing or during a manual service procedure.

Therefore the need persists to improve imaging systems through new calibration approaches.

SUMMARY OF THE INVENTION

Image capture systems and methods for calibrating an imaging system are provided. In one aspect of the invention, the imaging system has a body, a scene image capture system that captures images using a taking lens system that can be set to a plurality of different focus distances, and a rangefinder that is capable of determining a distance between the imaging system and at least one portion of a field of view of the taking lens system. The method comprises the steps of: automatically capturing a first calibration image of a first field of view through the taking lens system with the taking lens system set to a first focus distance setting; identifying a portion of the first calibration image having a predetermined degree of focus; using the rangefinder to determine a first calibration distance from the imaging device to the identified portion of the first calibration image; determining a focus correlation based upon the first calibration distance and the first focus distance setting, said focus correlation associating different rangefinder determined distances with each of the plurality of focus distance settings with at least one rangefinder determined distance; detecting a capture condition indicating that the scene image capture system is to be used to capture an archival image of a scene and, in response thereto, performing the steps of: determining a capture distance from the imaging system to a portion of the field of view of the taking lens system using the rangefinder, and setting the focus distance setting for the taking lens system for the capture of the archival image based upon the determined focus correlation and the determined capture distance.

BRIEF DESCRIPTION OF THE DRAWINGS

In the detailed description of the preferred embodiments presented below, reference is made to the accompanying drawings, in which:

FIG. 6 illustrates one example of a focus correlation;

FIG. 7 illustrates one example of a focus correlation;

FIG. 8 illustrates one example of a focus correlation;

FIG. 13 shows one example of a focus correlation;

FIG. 14 shows one example of a focus correlation;

FIG. 15 shows one example of a focus correlation;

DETAILED DESCRIPTION OF THE INVENTION

Before explaining the present embodiments in detail, it is to be understood that the embodiments are not limited to the particular descriptions and that it can be practiced or carried out in various ways.

Figure 1:
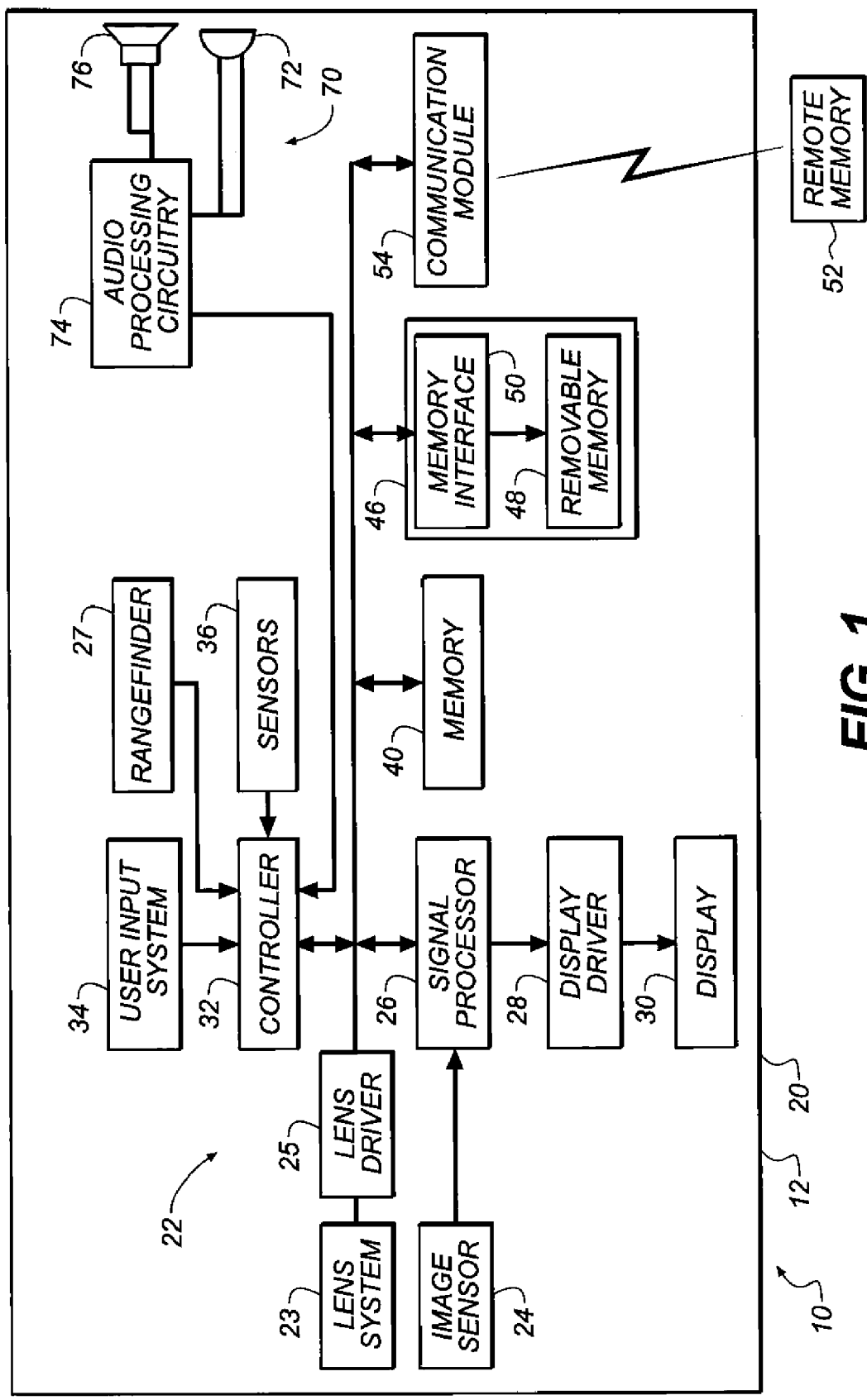
FIG. 1 shows a block diagram of one embodiment of an image capture system.
Figure 2:
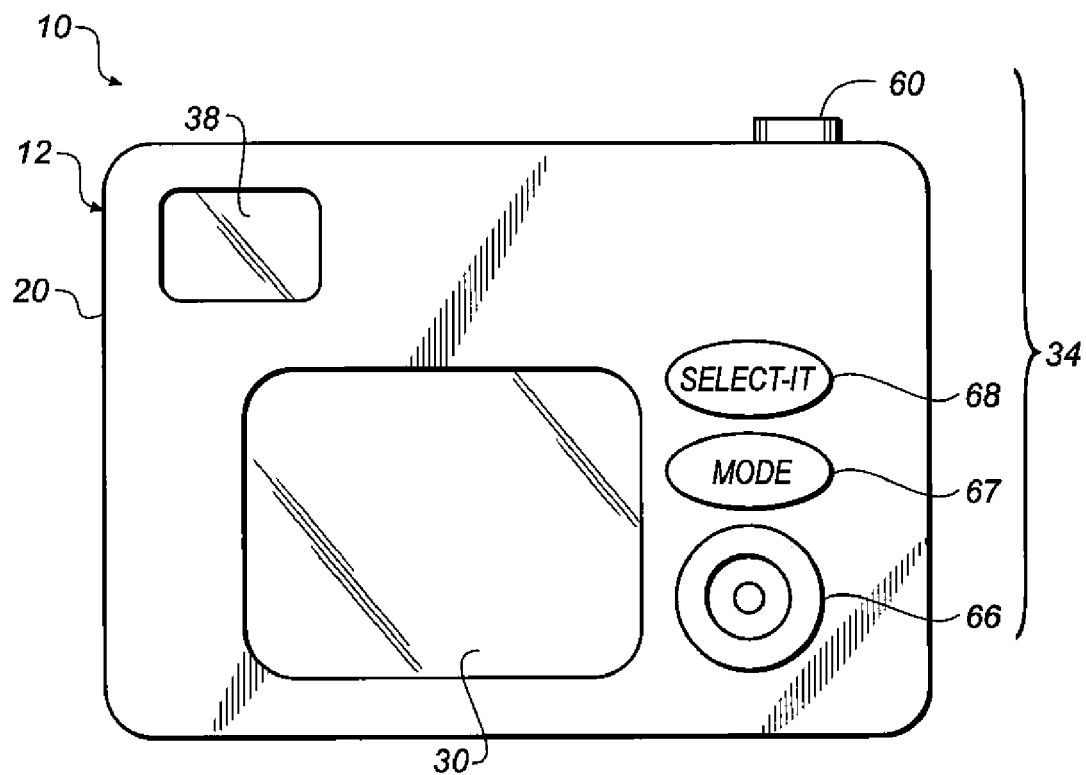
FIG. 2 shows a back, elevation view of the image capture system of FIG. 1.
Figure 3:
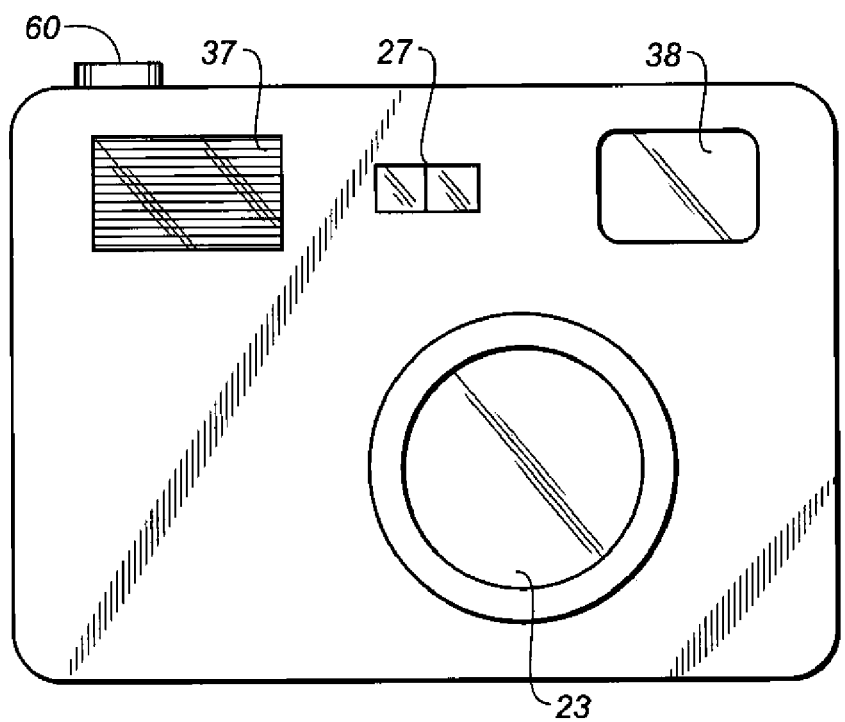
FIG. 3 shows a front, elevation view of the image capture system of FIG. 1.

FIG. 1 shows a block diagram of an embodiment of an imaging system 10. FIG. 2 shows a back, elevation view of the imaging system 10 of FIG. 1, while FIG. 3 shows a front elevation view of the imaging system 10 of FIG. 1. As is shown in FIGS. 1-3, imaging system 10 takes the form of a digital camera 12 comprising a body 20 to which a scene image capture system 22 and autofocus system 27 are mounted. Scene image capture system 22 having a taking lens system 23, a scene image sensor 24, a signal processor 26, an optional display driver 28 and a display 30. In operation, light from a scene is focused by taking lens system 23 to form an image on scene image sensor 24. Taking lens system 23 can have one or more elements.

Taking lens system 23 is of an automatically adjustable type. In the embodiment shown in FIGS. 1-3, taking lens system 23 is automatically adjusted to a variety of focus settings. In the example embodiment shown in FIG. 1, taking lens system 23 is a 6× zoom lens unit in which a mobile element or elements (not shown) are driven, relative to a stationary element or elements (not shown) by lens driver 25 that is motorized for automatic movement. Lens driver 25 controls both the lens focal length and the lens focus position of taking lens system 23 and sets a lens focal length and/or position based upon signals from signal processor 26, an optional automatic range finder system 27, and/or controller 32. It will be appreciated that in other embodiments, taking lens system 23 can comprise lenses having shapes that can be changed to provide an in situ variation of lens focus distance by modification of lens characteristics such as curvature. Examples of lens systems of this type include those that use, for example, liquid lens technology known to those of skill in the art. In such embodiments, lens driver 25 can provide signals to cause focus distance changes in the lens without use of a motor. Examples of such liquid lenses include lenses sold commercially under the name of FluidFocus by Royal Philips Electronics, Amsterdam, The Netherlands and other liquid lens products sold by PGS Precision, Singapore.

In the embodiment of FIG. 1, the focus position of taking lens system 23 can be automatically selected by a variety of known strategies. For example, in one embodiment, scene image sensor 24 is used to provide multi-spot autofocus using what is called the "through focus" or "whole way scanning" approach. As described in commonly assigned U.S. Pat. No. 5,877,809 entitled "Method Of Automatic Object Detection In An Image", filed by Omata et al. on Oct. 15, 1996, the disclosure of which is herein incorporated by reference. If the target object is moving, object tracking may be performed, as described in commonly assigned U.S. Pat. No. 6,067,114 entitled "Detecting Compositional Change in Image" filed by Omata et al. on Oct. 26, 1996, the disclosure of which is herein incorporated by reference. In an alternative embodiment, the focus values determined by "whole way scanning" are used to set a rough focus position, which is refined using a fine focus mode, as described in commonly assigned U.S. Pat. No. 5,715,483, entitled "Automatic Focusing Apparatus and Method", filed by Omata et al. on Oct. 11, 1998, the disclosure of which is herein incorporated by reference.

Digital camera 12 has a rangefinder 27. Rangefinder 27 is adapted to determine a distance from imaging system 20 to at least a portion of a field of view of taking lens system 23. Rangefinder 27 can determine the distance as an absolute distance measurement, such as a measurement in feet or meters, or as a relative distance measurement to the focus setting for taking lens system 23 that is appropriate for the distance to the subject without use of it. Rangefinder 27 can operate lens driver 25, directly or as shown in FIG. 1, can provide signals to signal processor 26 or controller 32 from which signal processor 26 or controller 32 can generate signals that are to be used for image capture. A wide variety of suitable multiple sensor rangefinders 27 known to those of skill in the art are suitable for use. For example, U.S. Pat. No. 5,440,369 entitled "Compact Camera With Automatic Focal Length Dependent Exposure Adjustments" filed by Tabata et al. on Nov. 30, 1993, the disclosure of which is herein incorporated by reference, discloses one such rangefinder 27. The focus determination provided by rangefinder 27 can be of the single-spot or multi-spot type. Preferably, the focus determination uses multiple spots. In multi-spot focus determination, the scene is divided into a grid of areas or spots, and the optimum focus distance is determined for each spot. One of the spots is identified as the subject of the image and the focus distance for that spot is used to set the focus of taking lens system 23.

A feedback loop is established between lens driver 25 and controller 32 and/or rangefinder 27 so that the focus position of taking lens system 23 can be rapidly set.

Taking lens system 23 is also optionally adjustable to provide a variable zoom. In the embodiment shown lens driver 25 automatically adjusts the position of one or more mobile elements (not shown) relative to one or more stationary elements (not shown) of taking lens system 23 based upon signals from signal processor 26, an automatic rangefinder 27, and/or controller 32 to provide a zoom magnification. Taking lens system 23 can be of a fixed zoom setting, manually adjustable and/or can employ other known arrangements for providing an adjustable zoom.

Light from the scene that is focused by taking lens system 23 onto scene image sensor 24 is converted into image signals representing an image of the scene. Scene image sensor 24 can comprise a charge couple device (CCD), a complimentary metal oxide sensor (CMOS), or any other electronic image sensor known to those of ordinary skill in the art. The image signals can be in digital or analog form.

Signal processor 26 receives image signals from scene image sensor 24 and transforms the image signals into a digital image in the form of digital data. The image can comprise one or more still images, multiple still images and/or a stream of apparently moving images such as a video segment. Where the digital image data comprises a stream of apparently moving images, the digital image data can comprise image data stored in an interleaved or interlaced image form, a sequence of still images, and/or other forms known to those of skill in the art of digital video.

Signal processor 26 can apply various image processing algorithms to the image signals when forming a digital image. These can include but are not limited to color and exposure balancing, interpolation and compression. Where the image signals are in the form of analog signals, signal processor 26 also converts these analog signals into a digital form. In certain embodiments, signal processor 26 can be adapted to process image signals so that the digital image formed thereby appears to have been captured at a different zoom setting than that actually provided by the optical lens system. This can be done by using a subset of the image signals from scene image sensor 24 and interpolating the subset of the image signals to form the digital image. This is known generally in the art as "digital zoom". Such digital zoom can be used to provide electronically controllable zoom adjusted in fixed focus, manual focus, and even automatically adjustable focus systems.

Controller 32 controls the operation of the imaging system 10 during imaging operations including, but not limited to, scene image capture device 22, display 30 and memory such as memory 40. Controller 32 causes scene image sensor 24, signal processor 26, display 30 and memory 40 to capture, present and store scene images in response to signals received from a user input system 34, data from signal processor 26 and data received from optional sensors 36. Controller 32 can comprise a microprocessor such as a programmable general purpose microprocessor, a dedicated micro-processor or micro-controller, a combination of discrete components or any other system that can be used to control operation of imaging system 10.

Controller 32 cooperates with a user input system 34 to allow imaging system 10 to interact with a user. User input system 34 can comprise any form of transducer or other device capable of receiving an input from a user and converting this input into a form that can be used by controller 32 in operating imaging system 10. For example, user input system 34 can comprise a touch screen input, a touch pad input, a 4-way switch, a 6-way switch, an 8-way switch, a stylus system, a trackball system, a joystick system, a voice recognition system, a gesture recognition system or other such systems. In the digital camera 12 embodiment of imaging system 10 shown in FIGS. 1 and 2 user input system 34 includes a capture button 60 that sends a capture signal to controller 32 indicating a desire to capture an archival image. User input system 34 can also include other buttons including the joystick 66, mode button 67, and the select it button 68 shown in FIG. 2.

Sensors 36 are optional and can include light sensors and other sensors known in the art that can be used to detect conditions in the environment surrounding imaging system 10 and to convert this information into a form that can be used by controller 32 in governing operation of imaging system 10. Sensors 36 can include audio sensors adapted to capture sounds. Such audio sensors can be of conventional design or can be capable of providing controllably focused audio capture such as the audio zoom system described in U.S. Pat. No. 4,862,278, entitled "Video Camera Microphone with Zoom Variable Acoustic Focus", filed by Dann et al. on Oct. 14, 1986. Sensors 36 can also include biometric sensors adapted to detect characteristics of a user for security and affective imaging purposes. Sensors 36 can also include temperature sensors or humidity sensors to detect the environmental conditions surrounding the imaging system 10. Where a need for additional scene illumination is determined, controller 32 can cause an optional source of artificial illumination 37 such as a light, strobe, or flash system to emit light.

Controller 32 causes an image signal and corresponding digital image to be formed when a capture condition is detected indicating a desire of a user to capture an archival image. Typically, the capture condition occurs when a user depresses capture button 60, however, controller 32 can determine that a capture condition exists at a particular time, or at a particular time after capture button 60 is depressed. Alternatively, controller 32 can determine that a capture condition exists when optional sensors 36 detect certain environmental conditions, such as optical or radio frequency signals. Further, controller 32 can determine that a capture condition exists based upon affective signals obtained from sensors 36 that are adapted to sense the physiology of a user.

Controller 32 can also be used to generate metadata in association with each image. Metadata is data that is related to a digital image or a portion of a digital image but that is not necessarily observable in the image itself. In this regard, controller 32 can receive signals from signal processor 26, camera user input system 34 and other sensors 36 and, optionally, generate metadata based upon such signals. The metadata can include, but is not limited to, information such as the time, date and location that the scene image was captured, the type of scene image sensor 24, mode setting information, integration time information, taking lens system 23 setting information that characterizes the process used to capture the scene image and processes, methods and algorithms used by imaging system 10 to form the scene image. The metadata can also include but is not limited to any other information determined by controller 32 or stored in any memory in imaging system 10 such as information that identifies imaging system 10, and/or instructions for rendering or otherwise processing the digital image with which the metadata is associated. The metadata can also comprise an instruction to incorporate a particular message into a digital image when the digital image is presented. Such a message can be a text message that is intended to be shown or rendered when the digital image is presented or rendered. The metadata can also include audio signals. The metadata can further include digital image data. In one embodiment of the invention, where digital zoom is used to form the image from a subset of the captured image, the metadata can include image data from portions of an image that are not incorporated into the subset of the digital image that is used to form the digital image. The metadata can also include any other information entered into imaging system 10, sensed by imaging system 10 or determined in whole or in part by imaging system 10.

A captured digital image and optional metadata, can be stored as an archival image or used for other purposes as described herein. A digital image can be stored, for example, in a compressed form. For example, where the digital image comprises a sequence of still images, the still images can be stored in a compressed form such as by using the JPEG (Joint Photographic Experts Group) ISO 10918-1 (ITU-T.81) standard. This JPEG compressed image data is stored using the so-called "Exif" image format defined in the Exchangeable Image File Format version 2.2 published by the Japan Electronics and Information Technology Industries Association JEITA CP-3451. Similarly, other compression systems such as the MPEG-4 (Motion Pictures Export Group) or Apple QuickTime™ standard can be used to store digital image data in a video form. Other image compression and storage forms can be used.

The digital images and metadata can be stored in a memory such as memory 40. Memory 40 can include conventional memory devices including solid state, magnetic, optical or other data storage devices. Memory 40 can be fixed within imaging system 10 or it can be removable. In the embodiment of FIG. 1, imaging system 10 is shown having a memory card slot 46 that holds a removable memory 48 such as a removable memory card and has a removable memory interface 50 for communicating with removable memory 48. The digital images and metadata can also be stored in a remote memory system 52 that is external to imaging system 10 such as a personal computer, computer network or other imaging system.

In the embodiment shown in FIGS. 1 and 2, imaging system 10 has a communication module 54 for communicating with external devices such as, for example, remote memory system 52. The communication module 54 can be for example, an optical, radio frequency or other wireless circuit or transducer that converts image and other data into a form, such as an optical signal, radio frequency signal or other form of signal, that can be conveyed to an external device. Communication module 54 can also be used to receive a digital image and other information from a host computer, network (not shown), or other digital image capture or image storage device. Controller 32 can also receive information and instructions from signals received by communication module 54 including but not limited to, signals from a remote control device (not shown) such as a remote trigger button (not shown) and can operate imaging system 10 in accordance with such signals.

Signal processor 26 and/or controller 32 also use image signals or the digital images to form evaluation images which have an appearance that correspond to scene images stored in imaging system 10 and are adapted for presentation on display 30. This allows users of imaging system 10 to use a display such as display 30 to view images that correspond to scene images that are available in imaging system 10. Such images can include images that have been captured by scene input capture device and/or that were otherwise obtained such as by way of communication module 54 and stored in a memory such as memory 40 or removable memory 48.

Display 30 can comprise, for example, a color liquid crystal display (LCD), organic light emitting display (OLED) also known as an organic electro-luminescent display (OELD) or other type of video display. Display 30 can be external as is shown in FIG. 2, or it can be internal for example used in a viewfinder system 38. Alternatively, imaging system 10 can have more than one display 30 with, for example, one being external and one internal.

Signal processor 26 and/or controller 32 can also cooperate to generate other images such as text, graphics, icons and other information for presentation on display 30. This can allow interactive communication between controller 32 and a user of imaging system 10, with display 30 providing information to the user of imaging system 10 and the user of imaging system 10 using user input system 34 to interactively provide information to imaging system 10. Imaging system 10 can also have other displays such as a segmented LCD or LED display (not shown) which can also permit signal processor 26 and/or controller 32 to provide information to user. This capability is used for a variety of purposes such as establishing modes of operation, entering control settings, user preferences, and providing warnings and instructions to a user of imaging system 10.

In the embodiments of FIGS. 1 and 2, imaging system 10 has an optional audio system 70 having an input transducer in the form of a microphone 72 that receives sonic energy and generates signals that are provided to audio processing circuitry 74. Audio processing circuitry 74 is adapted to convert the signals received from microphone 72 into an electronic audio signal representing the pattern of sonic energy incident upon the transducer. Audio processing circuitry 74 is further adapted to receive signals from controller 32 and to cause speaker 76 to generate audible sounds. Other systems such as known circuits, lights and actuators for generating visual signals, audio signals, vibrations, haptic feedback and other forms of signals can also be incorporated into imaging system 10 for use in providing information, feedback and warnings to the user of imaging system 10.

Typically, display 30 has less imaging resolution than scene image sensor 24. Accordingly, signal processor 26 reduces the resolution of a captured or stored image signal or digital image when forming evaluation images adapted for presentation on display 30. Down sampling and other conventional techniques for reducing the overall imaging resolution can be used. For example, resampling techniques such as are described in commonly assigned U.S. Pat. No. 5,164, 831 "Electronic Still Camera Providing Multi-Format Storage Of Full And Reduced Resolution Images" filed by Kuchta et al. on Mar. 15, 1990, can be used. The evaluation images can optionally be stored in a memory such as memory 40. The evaluation images can be adapted to be provided to an optional display driver 28 that can be used to drive display 30. Alternatively, the evaluation images can be converted into signals that can be transmitted by signal processor 26 in a form that directly causes display 30 to present the evaluation images. Where this is done, display driver 28 can be omitted.

Figure 4:
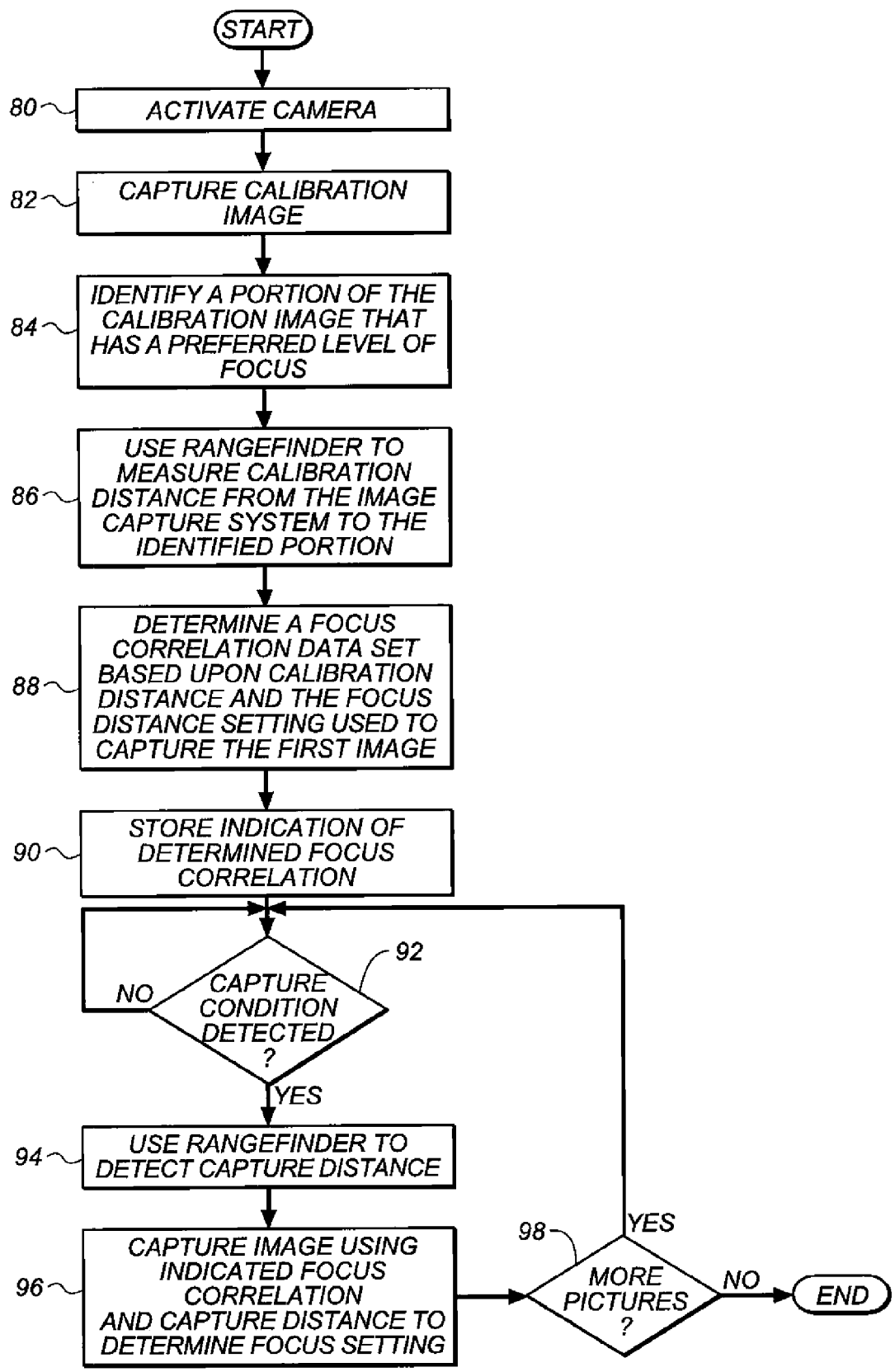
FIG. 4 shows a block flow diagram of one embodiment of an auto-calibrating rangefinder-based autofocus system.
Figure 5:
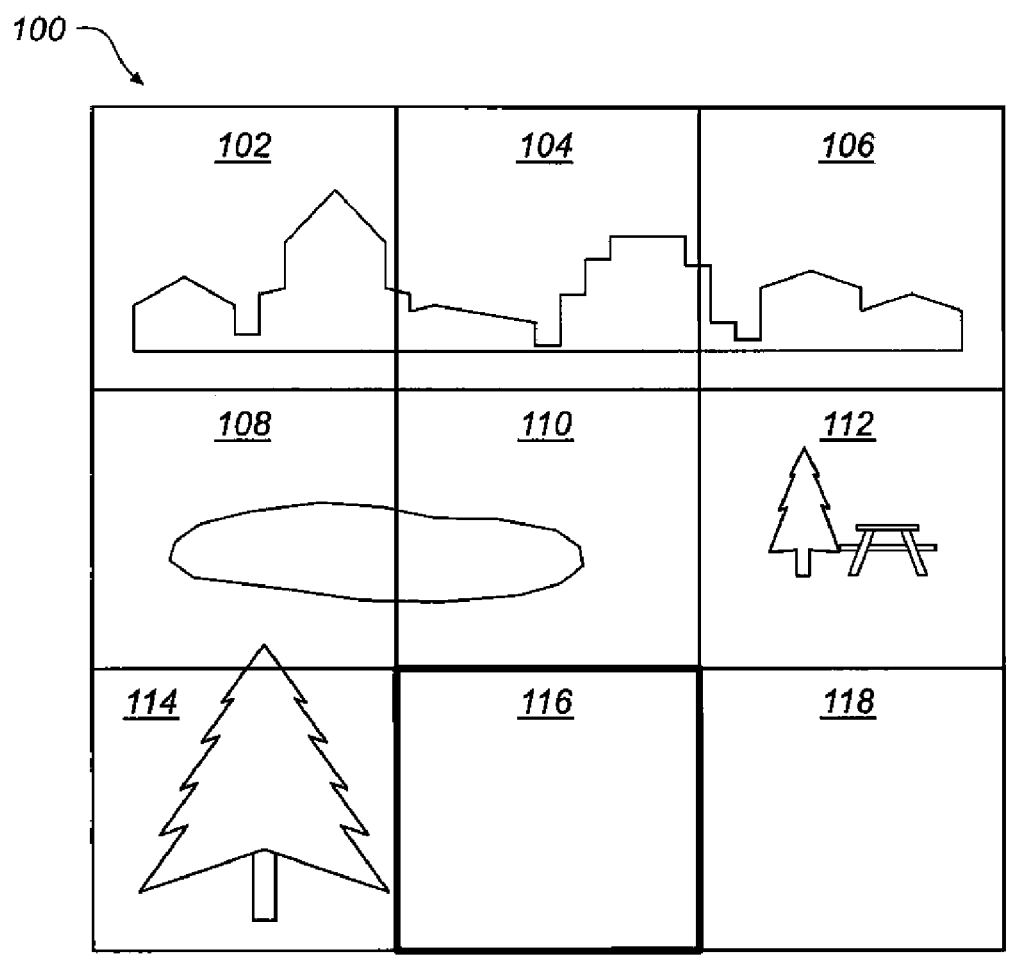
FIG. 5 illustrates one example of a calibration image.

FIG. 4 shows a block diagram of a first method for auto-calibrating the rangefinder based autofocus system in which a digital camera 12 is turned ON without an instruction to immediately capture an archival image. As is illustrated in FIG. 4, when controller 32 detects that a user has taken an action to activate digital camera 12 (step 80), controller 32 causes a calibration image 100 of a first field of view to be automatically captured (step 82). FIG. 5 illustrates one example of such a calibration image 100.

Controller 32 can determine a taking lens setting for use in capturing calibration image 100 by setting lens system 23 to a predetermined first focus distance setting which can be for example a position at a middle of an adjustable range of taking lens system 23. However, in other embodiments controller 32 can select any of the other focus distance settings. Alternatively, controller 32 can be adapted to capture an image using whatever focus distance setting lens system 23 is set at the moment that controller 32 detects some condition indicating that digital camera 12 is to be activated.

Signal processor 26 and/or controller 32 portion the calibration image 100 into portions 102-118 and identify one of the portions 102-118 of calibration images 100 as having a preferred level of focus as that term is understood in the art (step 84). Such focus level can, for example, be determined by examining any or all of the level of contrast, clarity, detail, distinctiveness or outline found in the image, or using any other known metric for analyzing image focus. The preferred level of focus can be defined in relative terms by way of comparison with other portions. In one specific example, where calibration image 100 is stored by compression in the frequency domain, portions of calibration image 100 having higher degrees of focus can be located by identifying portions in the stored image that have a greater amount of high frequency data which in turn is indicative of the level of focus.

Typically the various portions 102-118 of calibration image 100 will depict scene elements with greater and lesser degrees of focus and thus controller 32 or signal processor 26 will identify one area (e.g. area 116) as having the greatest degree of focus. It will be appreciated that in other embodiments, controller 32 can be adapted to simply identify the first portion that has a level of focus that is above a threshold and to select that portion. Other approaches can also be used.

Rangefinder 27 is used to measure a calibration focus distance from the digital camera 12 to selected portion 116 using for example multi-spot range finding to measure the distance from digital camera 12 to a portion of the field of view associated with the "spot" (step 86). In one embodiment, controller 32 and/or signal processor 26 divide calibration image 100 into portions that correspond directly to the portions associated with each "spot" used by rangefinder 27. However, this is not strictly necessary so long as there exists a general correspondence between the size and location of the identified portion 116 and the portion of the field of view used by rangefinder 27 in measuring the distance to the designated portion to measure a distance to that portion.

In one embodiment, calibration image 100 is captured at about the same time that rangefinding measurements are made for portions of the field of view associated with each rangefinding "spot" in the scene. This reduces the likelihood that the composition of the scene can change between the time of image capture and the time of rangefinding measurements. However, it will be appreciated that minor time variations will be acceptable in certain applications.

A focus correlation is then determined based upon the calibration distance and the focus distance setting used to capture the calibration image (step 88). The focus correlation can be any type of data, programmic, algorithmic, mathematical or logical structure that associates different rangefinder distance values with different focus settings for lens system 23. FIG. 6 shows one example of a focus correlation expressed, in this example, in the form of a two-dimensional look-up table (LUT). In this example, taking lens system 23 can be set into one of ten focus distance settings focusing light from a different range of distances onto scene image sensor 24 associated with a range of focus distances. Each of the ten focus distance settings is also associated with a rangefinding distance. In a typical camera of the prior art this correlation set is fixed for all images. However, as noted above, such an arrangement does not permit digital camera 12 to adjust to variations in operation due to environmental conditions or mechanical variations.

Accordingly, in this embodiment, digital camera 12 has a plurality of focus correlations available. For this example, controller 32 can select from two other focus correlation LUTs. This plurality is depicted herein as three different LUTs in FIGS. 6, 7 and 8. Controller 32 selects from among the available LUTs by looking for the focus correlation that provides a combination of focus setting and a capture focus distance that most closely correlates to the focus setting used to capture the calibration image and the calibration focus distance determined by rangefinder 27 for the portion of the image identified as having the predetermined degree of focus at that focus setting. For example, if taking lens system 23 was focused at setting 3 during capture of the calibration image and the determined focus calibration distance was 0.6 meters, then controller 32 would select the focus correlation depicted in FIG. 8.

In other embodiments, the focus correlation can take other forms and can be expressed, for example, in the form of a mathematical expression such as linear, binomial polynomial or other mathematical function. In similar fashion, controller 32 can select from among the mathematical expressions the one for which the focus setting and measured rangefinding distance best correlate. As is noted generally above in still other embodiments, the plurality of focus correlations can take the form of different programmic, algorithmic or logic structures including, but not limited to, a plurality of different fuzzy logic structures. Three dimensional LUTs can also be used.

Data is then stored in memory 40 in the form that indicates which of the determined focus correlations is to be used for future image capture operations (step 90). This storage process can also involve recording the time and date and or any other sensed conditions that may influence the selected focus correlation. This allows controller 32 to determine, at a later time, whether there exists a need to verify that the determined focus correlation is still valid. Further, where digital camera 12 has sensors 36 that are adapted to sense conditions such as humidity sensors of any type known in the art, temperature sensors of any type known in the art or any other sensors of conditions that might influence the operation of lens system 23, controller 32 can store data with the indication of the determined focus correlation that indicates the state of these conditions at the time of determining the focus correlation. In another embodiment where digital camera 12 has selectable scene modes for capturing particular types of images, such as landscape modes, portrait modes, close up modes and the like, the scene mode used during calibration can be stored with the indication.

In this embodiment, controller 32 is programmed or otherwise adapted so that when controller 32 detects a capture condition indicating that an archival image is to be captured (step 92), such as a user depression of capture button 60, controller 32 co-operates with rangefinder 27 to measure the distance from digital camera 12 to portions of the scene that are then determined to be within the field of view of taking lens system 23, and measures distances from digital camera 12 to a plurality of portions within the field of view, selects one of the portions as the subject of the image and uses the distance from digital camera 12 to the selected portion as a capture focus distance (step 94). Controller 32 then applies the capture focus distance to the determined focus correlation to determine a focus distance setting for image capture system 22 and captures the subsequent archival image (step 96). If more archival images are to be captured, the process returns to step 92, if not the process ends (step 98).

Figure 9:
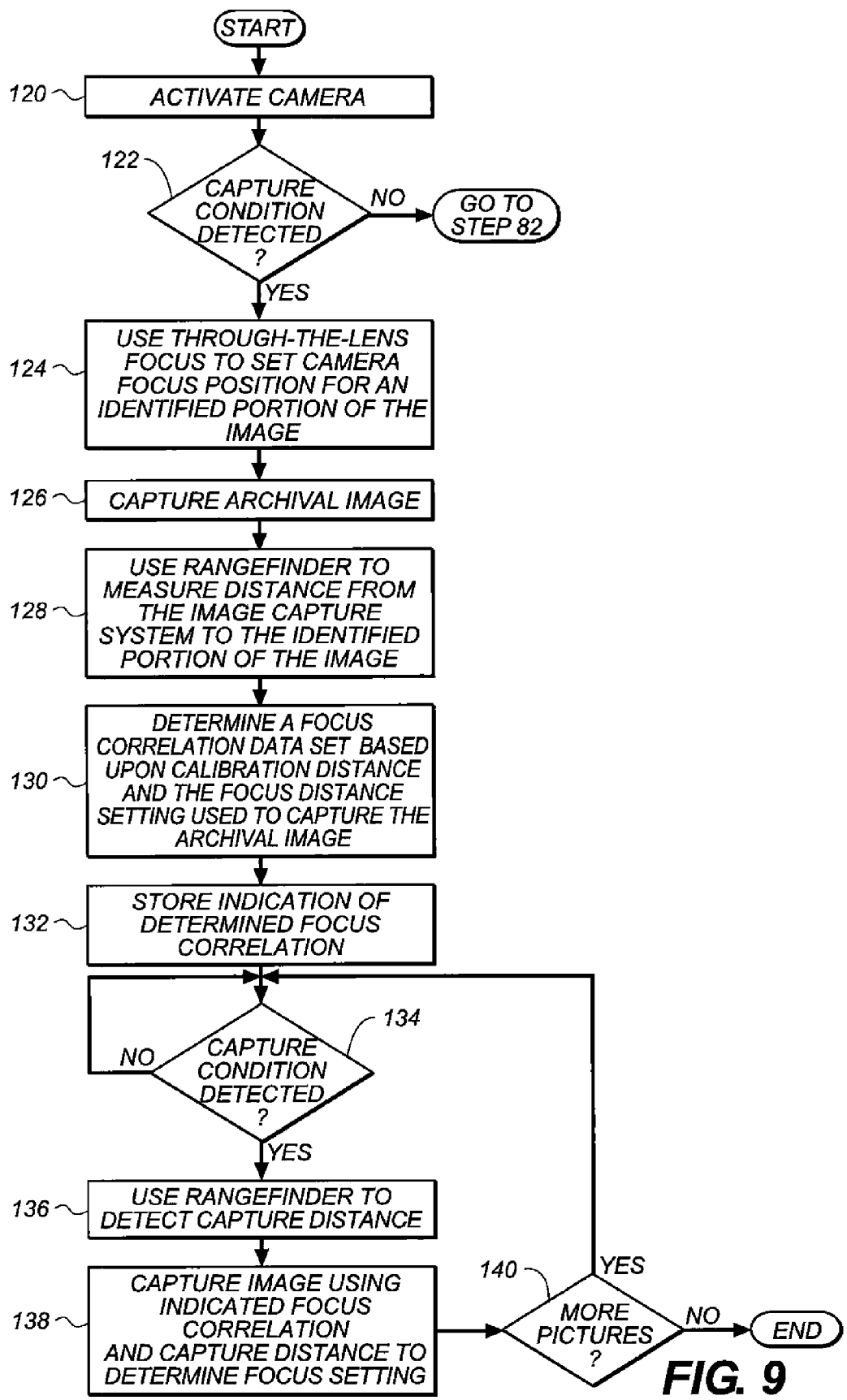
FIG. 9 shows another embodiment of a method for calibrating an imaging device.

FIG. 9 shows still another embodiment of a method for calibrating an imaging device which can be applied to help a digital camera 12 under circumstances where the user evidences a desire to immediately capture an archival image upon activation of the camera. This may occur, for example, where the user indicates a desire to capture an image immediately upon activation of digital camera 12. Under such circumstances, a user may not be willing to wait for the camera to execute the calibration process described above with respect to FIGS. 4-9 before capturing the image. Accordingly, in this embodiment, when controller 32 detects that digital camera 12 has been activated (step 120) and that a capture condition exists, such as may be caused by a depression of the capture button 60 (step 122), controller 32 uses a through-the-lens focus technique as described above in order to determine a setting for taking lens system 23 that causes at least a subject area portion of the field of view captured by taking lens system 23 to be in focus (step 124) and to capture an archival image at that focus setting (step 126).

At about the same time, rangefinder 27 determines a capture focus distance from digital camera 12 to the subject area portion of the field of view captured by taking lens system 23 (step 128). This can involve waiting until "through-the-lens" autofocusing has identified a portion as the subject area and then measuring the distance from digital camera 12 to that portion, or it can involve measuring the distance from rangefinder 27 to any portions within the field of view and then choosing the distance between rangefinder 27 and a portion that corresponds to the subject area as a calibration rangefinding distance.

A focus correlation is then determined based upon the calibration distance and the focus distance setting used to capture the archival image which in this case also comprises a calibration image (step 130) as described above. Data is then stored in memory 40 in the form of a plurality of focus correlations to be used for future image capture operations (step 132).

In this embodiment, when controller 32 determines that capture button 60 has been pushed again or otherwise determines that it is necessary to capture a second image (step 134), controller 32 then uses rangefinder 27 to determine a capture focus distance (step 136) and then uses the capture focus distance and the determined focus correlation to select a focus setting for taking lens system 23 for use in capturing a subsequent image (step 138). Where more images are to be captured (step 140), the process can return to step 134.

Figure 10:
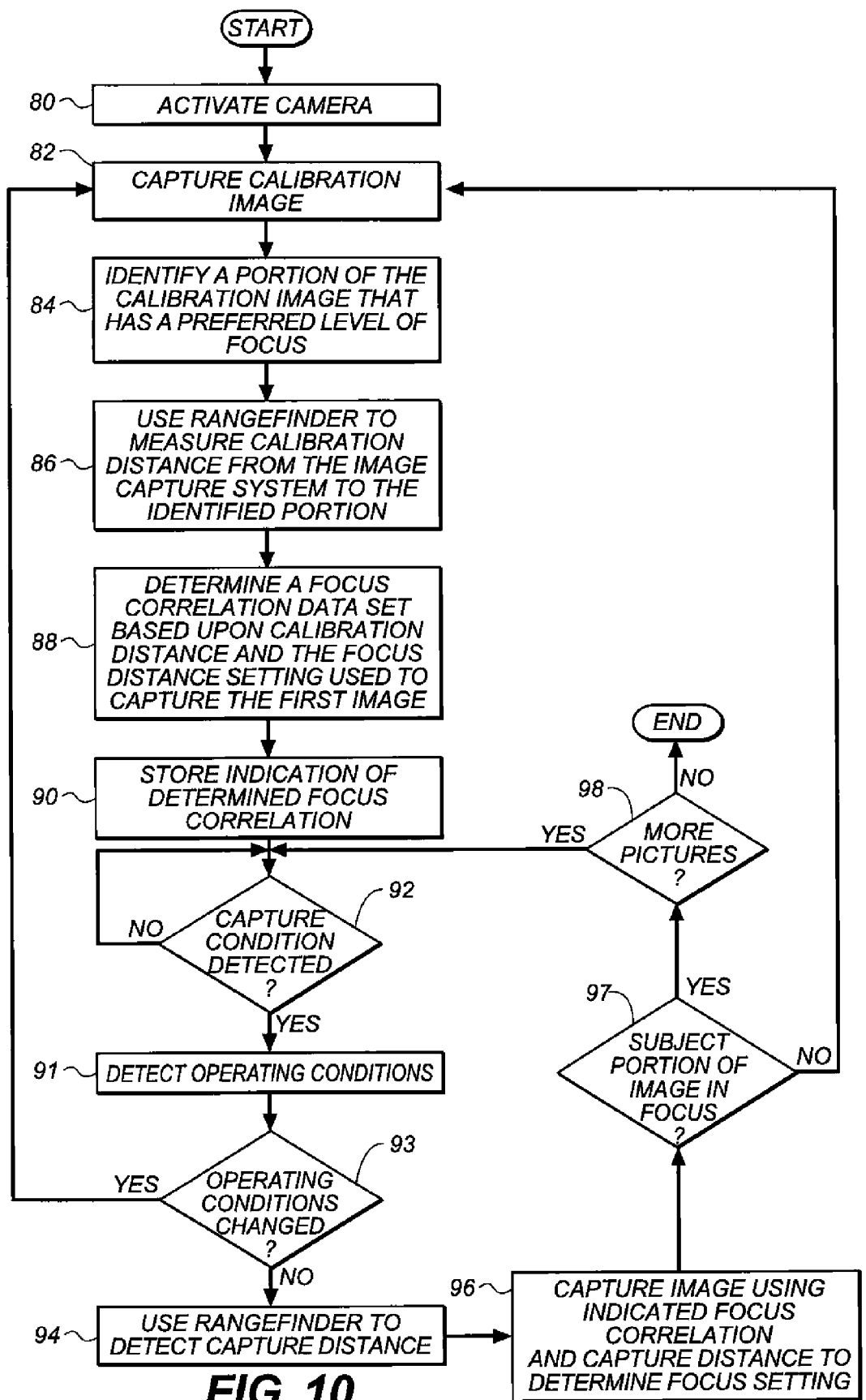
FIG. 10 shows another embodiment of a method for calibrating an imaging device.

It will be appreciated that in order to ensure optimum focus distance setting performance, it may be necessary to verify that a previously determined focus correlation remains valid. In the embodiment of FIG. 10, this is performed by adding a verification process (steps 91 and 93) within the method discussed above with respect to FIG. 4. In the example shown in FIG. 10, controller 32 can be adapted to determine that there is a reasonable possibility that camera operating conditions have changed since the last time that a focus correlation was determined (step 91). For example, where the step of storing an indication (step 90) includes storing date and time information indicating the date and time at which a focus correlation was last determined, controller 32 can use this information to determine whether so much time has elapsed since the last determination that it is necessary to do another calibration. If too much time has passed then the process returns to step 82 (step 93). A similar result can be obtained where scene mode information is stored with the indication.

A similar approach applies when temperature or other conditions are stored with the indication, in that if there has been a temperature or humidity change or a change in any other sensed conditions in which digital camera 12 is used, controller 32 can return the process to step 82. In an alternative not shown, the process can be returned to step 122 so that an archival image can be quickly captured with recalibration performed thereafter.

Where analysis of the calibration start condition does not suggest that there is a need for calibration (step 93) the process simply continues to allow image capture of a subsequent image using the previously determined image capture process.

An optional verification process (step 97) is also illustrated in FIG. 10 and can be performed with or without the optional step of sensing for a calibration start condition. In the verification process, the rangefinder 27 is used to sense a capture distance to a subject area within the field of view of lens system 23. The capture distance is then applied to the previously indicated focus correlation to determine a two-lens focus setting. Taking lens system 23 is then set to the indicated lens setting and an image is captured. Controller 32 and/or signal processor 26 then determines whether the portion of the captured image has a predetermined degree of focus. Where it is determined that controller 32 does not have the predetermined degree of focus in the subject area, controller 32 can return to step 82 for recalibration. In an alternative embodiment not shown, controller 32 can return to step 84 and can recalibrate by selecting a focus correlation using the last archival image and rangefinding data associated with the last archival image using the method described above in FIG. 10.

Figure 11:
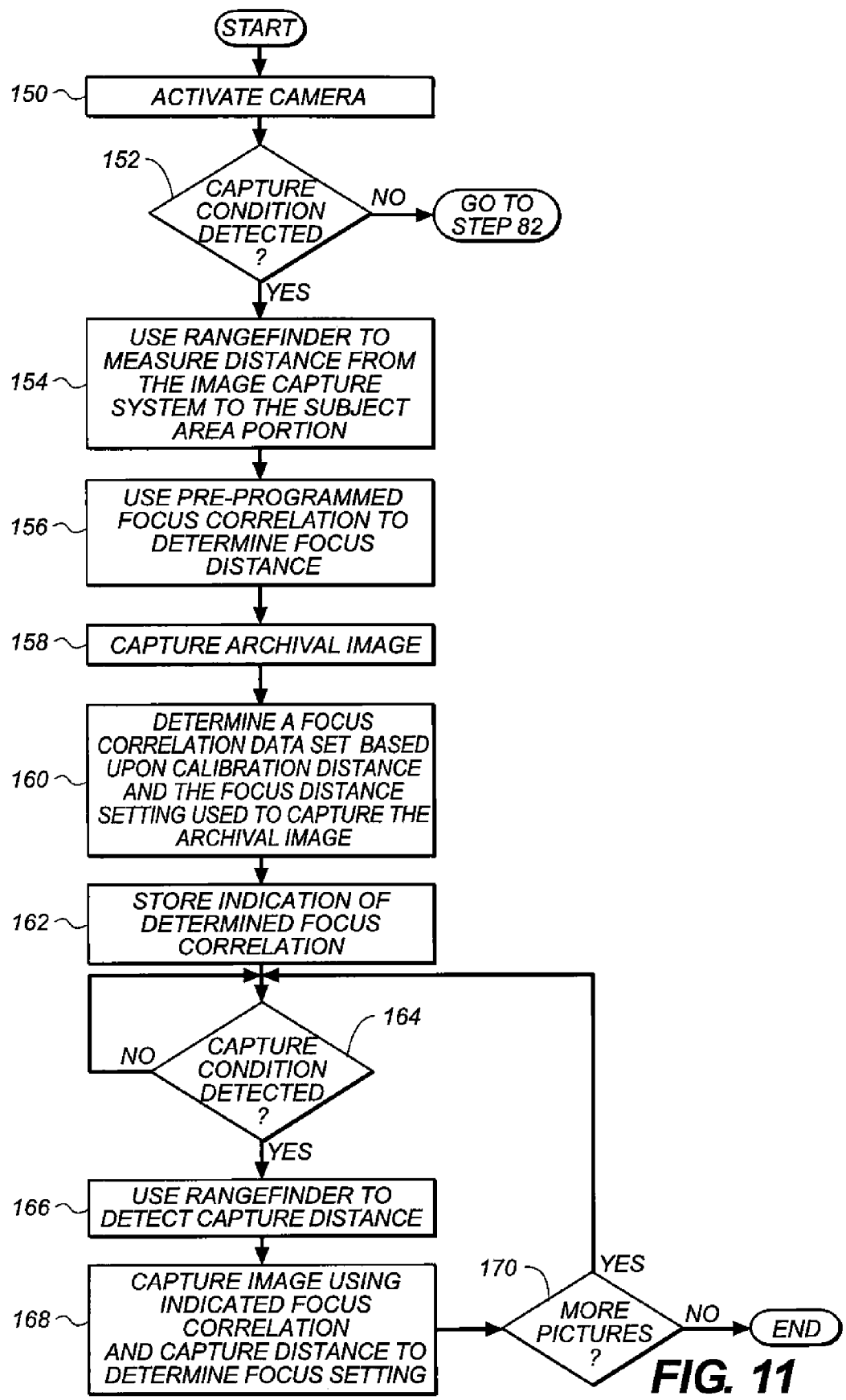
FIG. 11 shows another embodiment of a method for calibrating an imaging device.

FIG. 11 shows an alternative embodiment of a method for calibrating an imaging device 10, useful at least in a second scenario for auto-calibrating the rangefinder based autofocus system in which the user activates digital camera 12 (step 150) and immediately pushes capture button 60, or otherwise causes a capture condition to be generated (step 152). In this second case, rangefinder 27 measures the distance from digital camera 12 to a subject area portion in the field of view (step 154) and selects a preprogrammed focus correlation. The selected focus correlation and the measured distance is then used for archival image capture (step 158). At the first available opportunity, a focus correlation is determined (step 160) and an indication of the determined focus correlation is stored (step 162). Subsequent archival images can then be captured using rangefinder 27 and determined focus correlation (steps 164-170). The data for the measured distance and the calibration curve are then stored in memory 40 for later reference.

Figure 12:
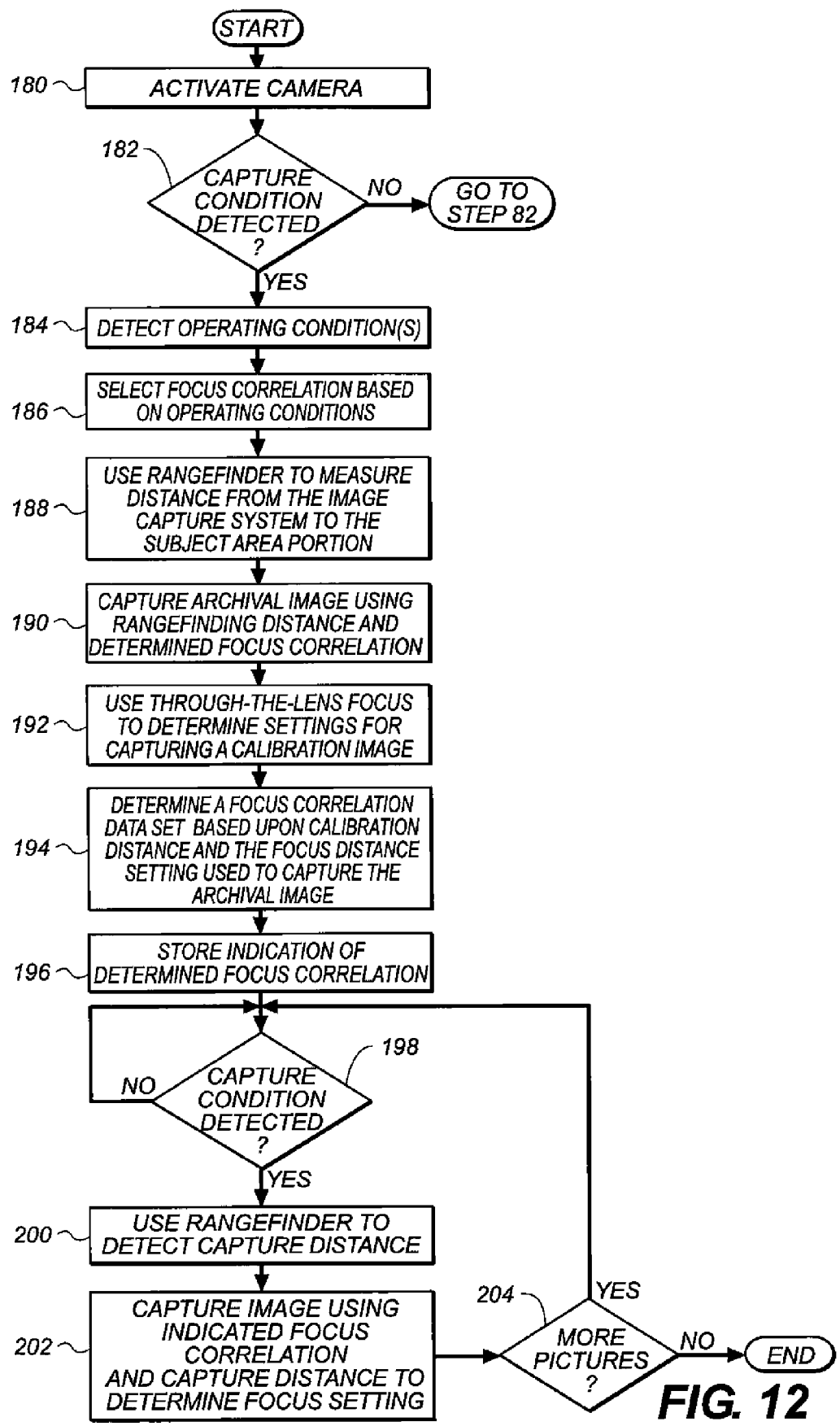
FIG. 12 shows another embodiment of a method for calibrating an imaging device;.

FIG. 12 shows a block diagram of yet another embodiment of a calibration method in which digital camera 12 is activated (step 180) and capture button 60 is pushed by the camera operator to indicate an immediate desire to capture an image (step 182). In response, controller 32 then detects an operating condition, such as a temperature, humidity, time of capture, scene type or other capture condition (step 184) and selects a focus correlation based upon the detected operating conditions. For example, controller 32 can cause a sensor 36 to measure the temperature of digital camera 12 and/or the environment around digital camera 12 (step 184). Controller 34 selects one of a set of focus correlations that are associated with a measured temperature range (step 186). FIGS. 13-15 illustrate for example, focus correlations in the form of three-dimensional LUTS, with each LUT being associated with a different range of temperatures.

Controller 32 then uses rangefinder 27 to measure a capture distance from digital camera 12 to the subject area portion of the field of view of taking lens system 23 (step 188) and captures an archival image with taking lens system 23 set to a focus distance that is selected based upon the focus correlation and the rangefinder measured capture distance (step 190).

At the first available opportunity, a through-the-lens method is used to determine a focus setting (step 192) for a calibration image, this is used to determine a focus correlation (step 194) and an indication of the determined focus correlation is stored (step 196). Subsequent archival images can then be captured using rangefinder 27 to measure captured distance and the determined focus correlation to determine lens focus distances for use in image capture (steps 198-204).

Figure 16:
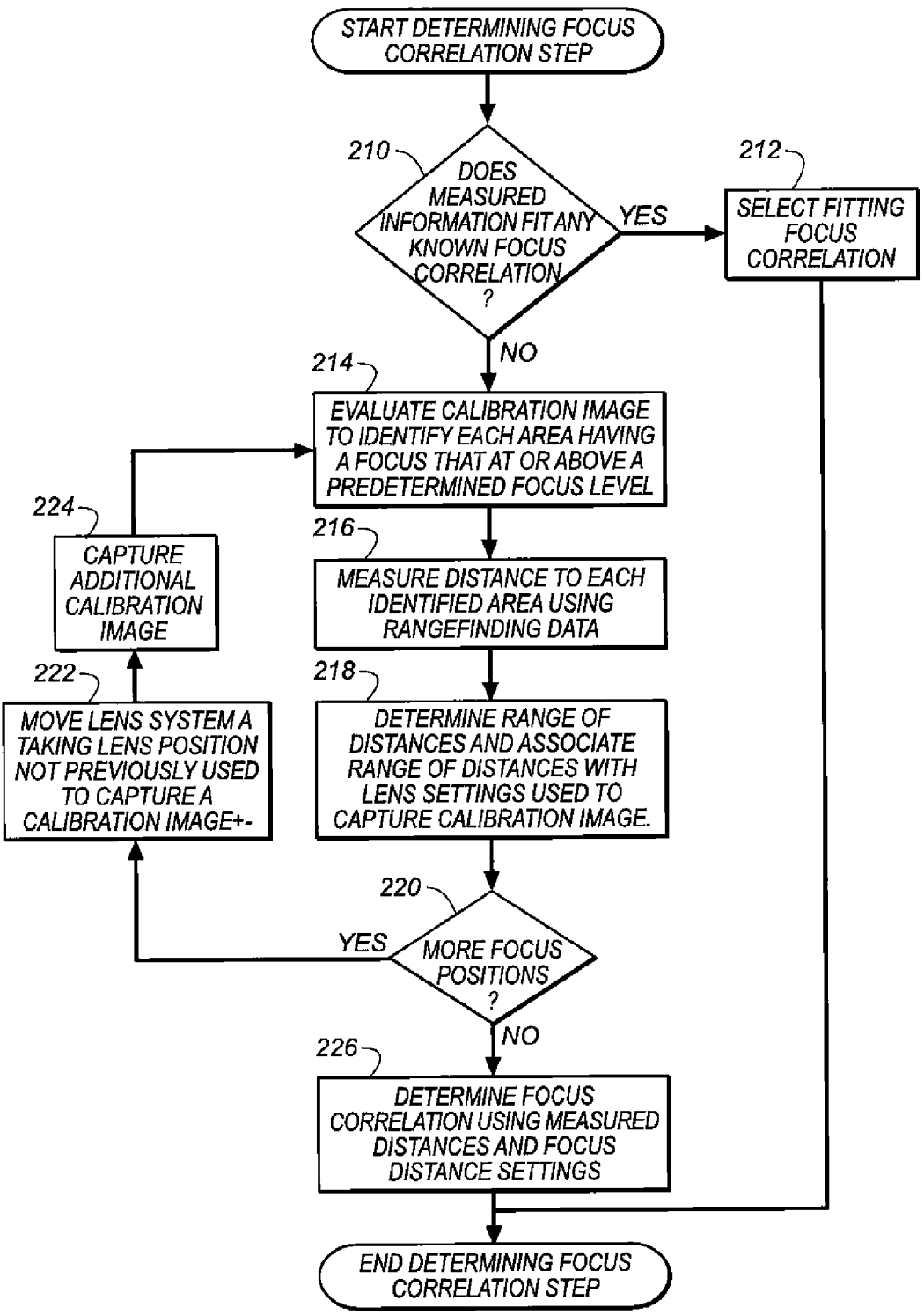
FIG. 16 shows another embodiment of a method for determining a focus correlation.

FIG. 16 shows an alternative embodiment of a method for determining a focus correlation that can be used for example in any of steps 88, 130, 164, or 194. In this embodiment, controller 32 first examines whether any existing focus correlation fits with the measured rangefinding distance and the focus distance setting used to capture a calibration image or archival image (step 210). If so, the fitting focus correlation is used and the process ends (step 212). If not, controller 32 evaluates the calibration image to identify at least one portion of the calibration image having a focus that is at or above the predetermined focus level (step 214). Rangefinder 27 is then used to measure a distance to the portions of the calibration image that are in focus with taking lens system 23 at the focus distance setting used to capture the calibration image (step 216). The measured range of distances is then associated with the focus distance setting used to capture the calibration image and forms a portion of a focus correlation (step 218).

If a calibration image has not yet been captured at each of a plurality of focus distance settings representing the range of focus distance settings that taking lens system 23 can be moved into (step 220) then taking lens system 23 is moved to a different focus distance setting (step 222) and an additional calibration image is captured (step 224). Steps 214-220 are repeated until a calibration image has been captured at each of a plurality of focus distance settings representing the range of focus distance settings that taking lens system 23 can be moved into and steps 214-220 have been performed on all of these images. A focus correlation is then determined using the data associations obtained during the performance of steps 214-220 (step 226) and the process returns to the steps described above.

In one embodiment this is done simply by associating each of the focus distance positions with the range of distances measured when that focus distance was used. In other embodiments interpolation and/or regression techniques can be used to define a range of focus distance measurement with each focus distance setting to form the focus correlation. Alternatively, an existing focus correlation can be adjusted to determine focus correlation based upon the measured information.

Figure 17:
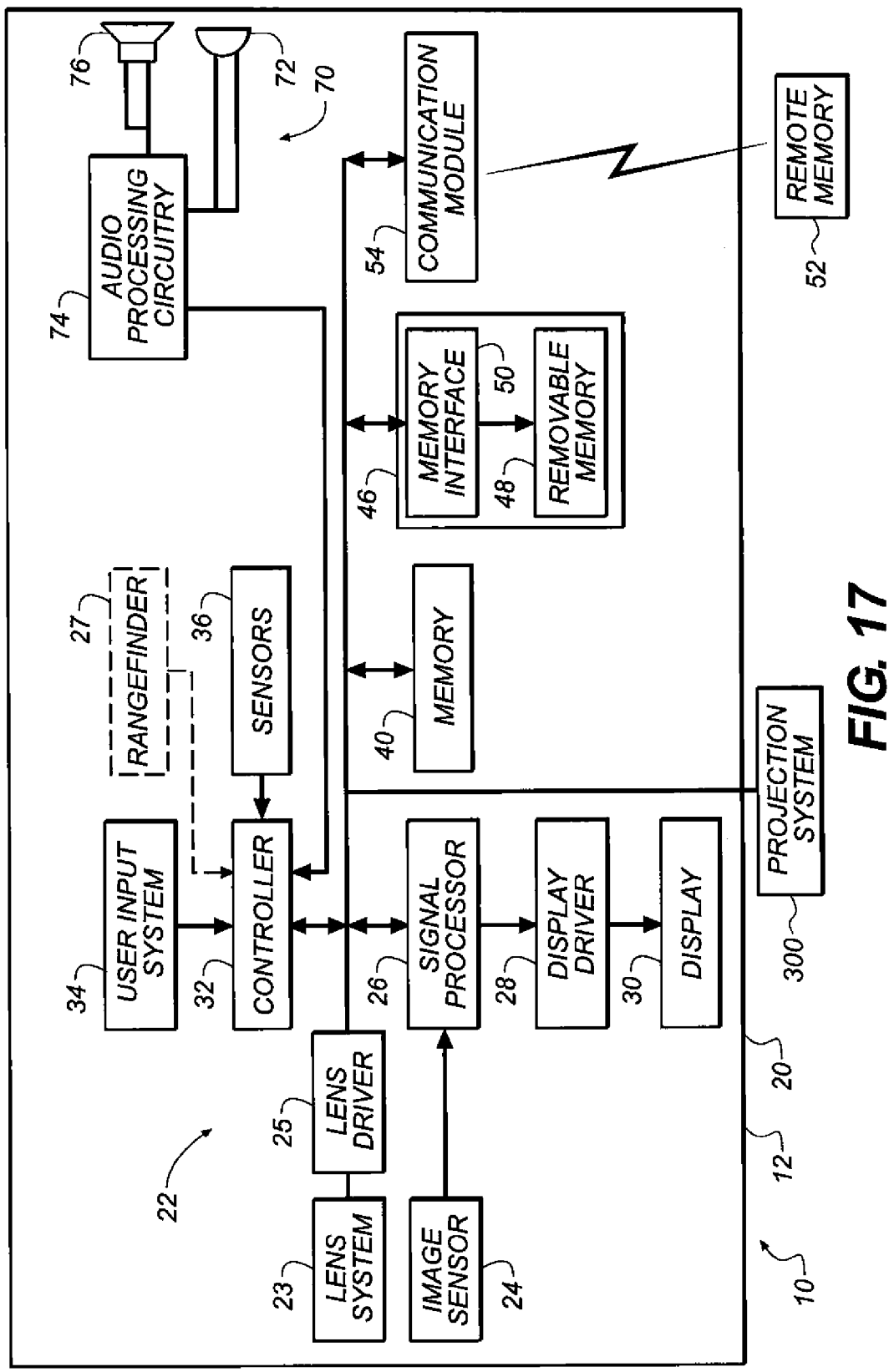
FIG. 17 shows an embodiment of an imaging device with an associated projection system.
Figure 18:
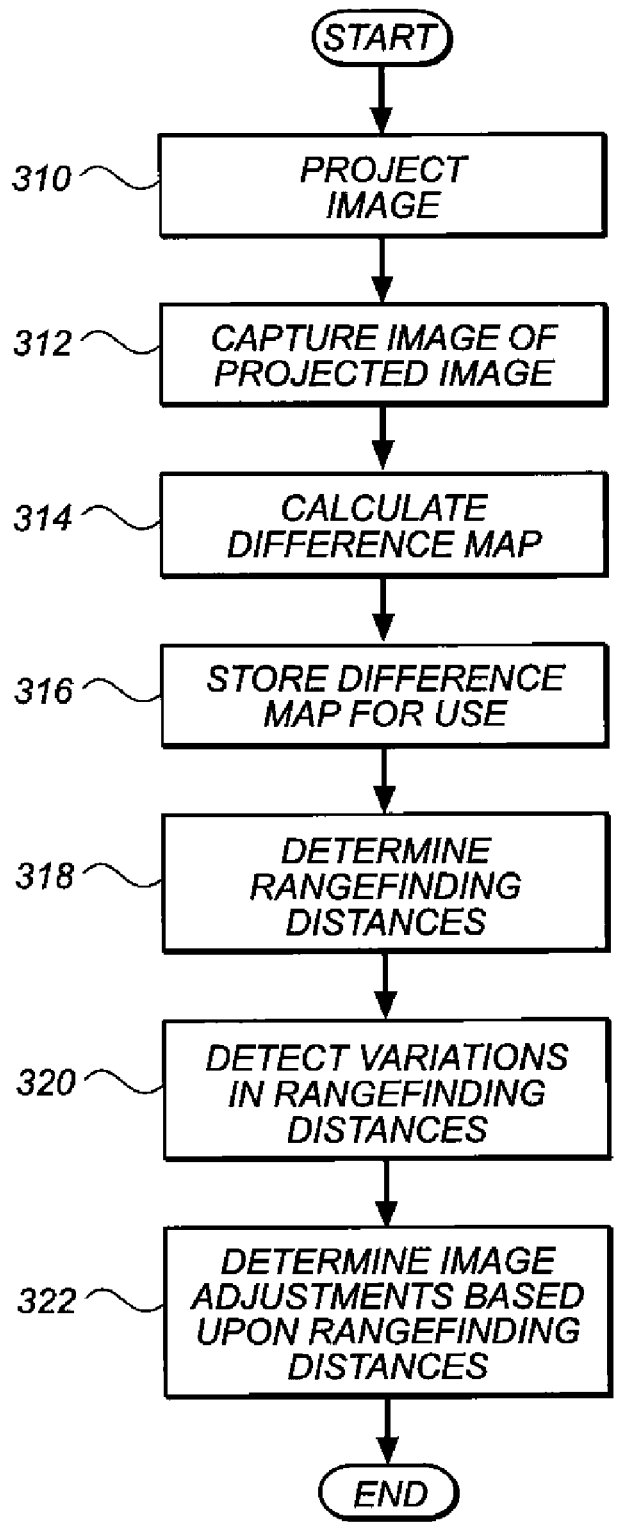
FIG. 18 shows a method for calibrating the projection system.

FIG. 17 shows a block diagram of another embodiment wherein imaging system 10 is operably associated with a digital video image projection system 300 and FIG. 18 shows a method for using imaging system 10 to help improve image quality of an image projected by projection system 300. This can be done for example, by physically linking the projection system 300 to imaging system 10 such as by way of a wired or optical connection or by way of a wireless connection.

Where such an arrangement is provided, imaging system 10 can interact with projection system 300 to provide improved quality projected images. For example, FIG. 18 shows a block diagram of an embodiment in which imaging system 10 is used to calibrate a projection system 300. Projection system 300 can be mounted to body 20 or it can be separate therefrom with a physical connection therebetween, such as a wired connection or other logical connection therebetween, such as a wireless connection.

Projection system 300 receives a digital image and projects the image onto an available wall or other available surface (step 310). It will be appreciated that the appearance of a projected image formed thereon is a product of a combination of the received image, the projection system and color, light and reflection characteristics of the available wall or other available projection surface. In particular, the surface that the image is being projected on is often not an ideal white surface, such as often occurs when the projector is used in a home environment or business travel environment or in spontaneous sharing moments when a projection screen is not available, instead the surface often has it's own color or multiple colors or shadows or even a texture. In this case it would be beneficial to the projected image quality if the image could be adjusted to calibrate for the characteristics of the surface that the image is to be projected onto. Further, in some cases, it may be desirable, or necessary, to project the image against a surface having meaningful topographical variations such that might impact a focus distance. Accordingly, compensation for these factors is preferred.

To provide such compensation, controller 32 causes an image to be captured of the projected image (step 312) with taking lens system 23 set so that the captured image encompasses at least a portion of the projected image. The captured image of the projected image is then compared to the corresponding portion of the original image by controller 32 and/or signal processor 26 to form a difference map (step 314). The difference map reflects differences between the appearance of the received image and the appearance of the image as a function of the projection system and the color, light and reflection characteristics of the available wall or other available surface. The difference map is then provided for use by imaging system 10 or projection system 300 in adjusting the projected image by recalibrating the digital projector for the projection system and the color or colors of the wall or any shadows on the wall or any texture that is present on the available wall or other available surface (step 316).

Measuring data from rangefinder 27 can also be obtained (step 318) and used as a part of this process first to calibrate imaging system 10 as described above and also to be used to detect any variations in the shape, depth, or orientation of the projection surface which may not be readily apparent from the image captured by the scene image capture system 22 (step 320). Signal processor 26 and/or controller 32 can use the detected distance information to determine possible modifications to the difference map or other signals that are provided for use in modified images presented by projection system 300 (step 322). Alternatively, controller 32 can generate focus adjustments for use by projection system 300. In particular, controller 32 can be adapted to use determined rangefinder distances for various portions of a surface onto which an image is projected and can cause focus setting adjustments to be made. In one embodiment of the imaging system 10 illustrated in FIG. 16, it is contemplated that imaging system 10 will comprise a projection system 300 that is not permanently connected to body 20 and that can be connected thereto, as desired, during periods of cooperation. It will be appreciated that in such an embodiment, calibration of projection system 300 becomes possible using structures provided by the digital camera 12 so that the calibration benefits described herein can be obtained without incorporating such structures into projection system 300.

In this embodiment, it is important to note that the calibration may be performed for each setup of the projection system 300 or for each projected image individually. In the case where the calibration is performed for each projected image individually, a new difference map is formed for each projected image individually. In the case where the calibration is performed for each setup, a difference map is formed for the first projected image and then the same difference map is applied to each subsequent projected image.

In a further embodiment, will be appreciated that scene image sensor 24 has a plurality of image sensing positions each having a gain. The gain at each image sensing pixel can vary from pixel to pixel. Accordingly, another aspect of imaging system 10 that could benefit from calibration is calibration of the image capture system 22 when using a multi-channel type image sensor 24. In the case of a multi-channel type image sensor 24, the response of the image to light from the scene is typically slightly different between channels. Minor variations during fabrication of the image sensors cause differences in the electrical characteristics of the channels and slightly different gain, typically on the order of 1%. These differences in channel response result in abrupt changes in the image along the corresponding lines where the channels abut one another on the image sensor. In addition, the differences between channels change over time and as the environmental conditions such as temperature and humidity change.

If these gain variations are not compensated for, they can introduce noise in captured digital images. Accordingly, a calibration method is needed which can enable compensation of the channel differences to be compensated to improve image quality. What is also needed is a calibration method that can react to changes in channel differences over time and as environmental conditions such as temperature and humidity change.

To filter such effects from captured images, controller 32 can capture an image with low contrast which can be used to calibrate the gain of image capture pixels or the channels for a multi-channel image sensor 24. To achieve this, a position of extreme defocus is identified by the autofocus system in which the image has low contrast. The low contrast image is then used by the signal processor 26 to set the gains or offsets for the different pixels and channels of the image sensor 24 to compensate for the differences in electrical characteristics present on the multiple channels of the image sensor 24. In this context, it is worth noting the low contrast is relative to the spatial frequency associated with the pixels between channels.

The invention has been described in detail with particular reference to certain preferred embodiments thereof, but it will be understood that variations and modifications can be effected within the spirit and scope of the invention.

PARTS LIST 10 imaging system
12 digital camera
20 body
22 scene image capture system
23 taking lens system
24 scene image sensor
25 lens driver
26 signal processor
27 automatic rangefinder
28 display driver
30 display
32 controller
34 user input system
36 sensors
37 artificial illumination source
38 viewfinder
40 memory
46 memory card slot
48 removable memory
50 removable memory interface
52 remote memory system
54 communication module
60 capture button
66 joystick
67 mode button
68 select-it button
70 audio system
72 microphone
74 audio processing circuitry
76 speaker
80 activate camera step
82 capture calibration image step
84 identify portion of calibration image that has preferred level of focus step
86 measure calibration distance from image capture system to identified portion step
88 determine focus correlation step
90 store indication step
91 detect operating conditions step
92 capture condition detected step
93 operating conditions changed step
94 detect capture distance step
96 capture image and capture distance to determine focus setting step 97 verify focus in subject portion of image step
98 more images determine step
100 calibration image
102 portion of calibration image
104 portion of calibration image
106 portion of calibration image
108 portion of calibration image
110 portion of calibration image
112 portion of calibration image
114 portion of calibration image
116 portion of calibration image
118 portion of calibration image
120 camera activated step
122 detect capture depression step
124 use through-the-lens focus technique to determine focus distance setting step
126 capture archival image step
128 determine capture focus distance from camera to subject area of field of view captured step
130 focus correlation determined step
132 stored data to be used for future image capture operations step
134 determination to capture a second image step
136 determine capture focus distance step
138 select focus setting for use in capturing subsequent image step
140 capture more images step
150 activate camera step
152 capture button pushed step
154 measure distance from image capture system to subject area portion step
156 use pre-programmed focus correlation to determine focus distance step
158 capture archival image step
160 determine a focus correlation and the focus distance used to capture archival image step
162 store indication of determined focus correlation step
164 capture condition detected step
166 detect capture distance step
168 capture image and capture distance to determine focus setting step
170 more images determining step
180 activate camera step
182 capture button pushed step
184 detect operating conditions step
186 select focus correlation based upon operating conditions step
188 measure distance from capture system to subject area portion step
190 capture archival image step
192 use through-the-lens focus to determine settings for capturing archival image step
194 determine a focus correlation step
196 store correlation step
198 detect capture condition step
200 detect capture distance step
202 capture image step
204 more images determining step
210 does measured information fit known focus correlation
212 select fitting focus correlation
214 identify portion of calibration image having focus above predetermined focus level
216 measure distance step
218 determine and associate range of distances step
220 more focus positions step
222 move lens system to capture a calibration image step
224 capture additional calibration image step
226 determine focus correlation step
300 projection system
310 project image step
312 capture image of projected image step
314 calculate difference map step
316 store difference map for use step
317 adjust projected image step based on difference map
318 determine rangefinding distances step
320 detect variations in rangefinding distances step
322 determine image adjustments based upon rangefinding distances step
323 adjust projected image step based on rangefinding distances

The invention claimed is:

1. A method for calibrating an imaging system having mounted to a body, a scene image capture system that captures images using a taking lens system that can be set to a plurality of different focus distances and a rangefinder that is capable of determining a distance between the imaging system and at least one portion of a field of view of the taking lens system, without using the image capture system, the method comprising the steps of:
automatically capturing a first calibration image of a first field of view through the taking lens system with the taking lens system set to a first focus distance setting;
identifying a portion of the first calibration image having a predetermined degree of focus;
using the rangefinder to determine a first calibration distance from the imaging device to the identified portion of the first calibration image;
determining a focus correlation based upon the first calibration distance and the first focus distance setting, said focus correlation associating each of the plurality of focus distance settings with at least one rangefinder determined distance; and
detecting a capture condition indicating that the scene image capture system is to be used to capture an archival image of a scene, and in response thereto, performing the steps of:
determining a capture distance from the imaging system to a portion of the field of view of the taking lens system using the rangefinder, and setting the focus distance setting for the taking lens system for the capture of the archival image based upon the determined focus correlation and the determined capture distance.

2. The method of claim 1, further comprising the steps of:
capturing a second calibration image with the taking lens system focused at a second focus distance setting that is different from the first focus distance setting and that depicts a portion of a second field of view having a predetermined degree of focus; and
using the rangefinder to measure a second calibration distance from the imaging system to the portion of the field of view depicted in the second image having the predetermined degree of focus;
wherein the step of determining a focus correlation comprises determining the focus correlation based upon the first calibration distance, the first focus distance setting, the second calibration distance, and the second focus distance setting.

3. The method of claim 1, wherein said focus correlation comprises any of a two-dimensional look up table, a three-dimensional look up table, a binomial, a polynomial, a fuzzy logic structure or an algorithm.

4. The method of claim 1, wherein said step of determining a focus correlation comprises selecting from among a predetermined number of different focus correlations.

5. The method of claim 1, wherein said step of determining a focus correlation comprises adjusting mathematical or other logical models of the relationship between different rangefinder determined distance values and the plurality of focus settings.

6. The method of claim 1, wherein said steps of capturing, identifying, using, and determining a focus correlation are performed automatically when it is detected that there is a reasonable possibility that camera operating conditions have changed since a last calibration, such camera operating condition comprising any of time change, a change in scene mode, a change in temperature or a change in humidity.

7. The method of claim 1, further comprising the step of determining when there is insufficient time to capture a calibration image before capturing an archival image and, in response thereto, selecting a preliminary focus correlation using a predetermined focus correlation using the rangefinding distance and lens settings used to capture the archival image, using a through-the-lens focusing technique, or using sensed conditions.

8. The method of claim 1, further comprising the steps of:
defocusing the lens system to obtain a low contrast image;
identifying areas of different contrast; and
adjusting gains for particular portions of an image sensor in the scene image capture system to provide even contrast.

9. The method of claim 1, further comprising the steps of:
receiving a digital image;
causing a digital image projection system to project the obtained digital image onto a surface;
capturing an image of the projected image;
determining a difference map by comparison of the digital image and the captured image of the projected image; and
using the difference map to alter the projected image to reduce the extent to which conditions on the surface induce artifacts in the appearance of the projected image so that the projected image has an appearance that more closely simulates the appearance of the received digital image.

10. The method of claim 9, further comprising the steps of:
obtaining rangefinding information for the surface; and
using the rangefinding information to adjust the projection of the received image.

11. The method of claim 9, wherein the difference map is obtained for each surface that is projected on; and the difference map is used as a calibration for the digital image projection system.

12. The method of claim 9, wherein the difference map is obtained for each projected image; and the difference map is used as a calibration for the digital image projection system.

13. A method for calibrating a scene image capture system having a taking lens system that focuses light from a field of view onto an image sensor and that can be set to a range of different focus settings to provide different focus distances said image capture system being mounted to a common body with a rangefinder that determines distances from the scene image capture system to portions of a scene within the field of view without using the scene image capture system, the method comprising the steps of:
capturing a set of images with the taking lens system automatically set to a range of different focus settings for each image; and
identifying captured images that were captured with the lens system at different settings than others of the captured images and that depict a portion of the field of view in focus, and obtaining for each identified image a rangefinder determined distance from the scene image capture system to the portion of the field of view depicted in the identified image that has a predetermined degree of focus; and
storing correlation data that associates the rangefinder determined distance for the image and setting of the taking lens system at the time that the additional image was captured, so that a focus correlation can be established associating distance values with corresponding focus settings over the range of different focus settings.

14. The method of claim 13, further comprising the step of detecting a scene mode for capturing an image and wherein the steps of capturing, identifying, using, and storing are performed with more focus correlation data being obtained for distances that are within a first range that are obtained for a second similar distance range, wherein the first distance range and the second distance range are determined based upon a detected user input action, or camera operating condition.

15. An imaging system comprising
a body,
a scene image capture system mounted to the body, said scene image capture system capturing images using a taking lens system that can be set to a plurality of different focus distances;
a rangefinder mounted to the body, said rangefinder being adapted to determine a distance between the rangefinder and a portion of a scene within a field of view of the scene image capture system; and
a controller adapted to automatically capture a first calibration image through the taking lens system with the taking lens system set to a first focus distance setting, to identify a portion of the first calibration image having a predetermined degree of focus and to use the rangefinder to measure a first calibration distance from the imaging device to the identified portion;
wherein said controller determines a focus correlation based upon the first calibration distance and the first focus distance setting used to capture the first image, said focus correlation associating different rangefinder determined distances with the plurality of focus distance settings; said controller further being adapted to detect a capture condition indicating that the image capture system is to be used to capture an archival image of a scene, and, when the capture condition is detected, the controller causes the rangefinder to determine a capture distance from the imaging system to a portion of the field of view of the taking lens system, and the focus distance setting for the taking lens system is set for the capture of the image based upon the determined focus correlation and the determined capture distance.

16. The imaging system of claim 15, wherein said controller is further adapted to capture a second calibration image with the lens system focused at a second focus distance setting that is different from the first focus distance setting and that depicts a portion of the field of view having a predetermined degree of focus;
uses the rangefinder to measure a second calibration distance from the imaging system to the portion of the field of view depicted in the second image that has the predetermined degree of focus;
wherein the controller determines a focus correlation by determining the focus correlation based upon the first calibration distance, the first focus distance setting, the second calibration distance, and the second focus distance setting.

17. The imaging system of claim 15, further comprising a projection system adapted to receive a digital image and to cause the digital image to be projected onto a surface, said controller further being adapted to obtain rangefinding information for the surface and to adapt a focus setting of the projection system based upon the rangefinding information.

18. The imaging system of claim 17, wherein the controller is further adapted to cause the scene image capture system to capture a calibration image of the projected image and to adapt the focus setting of the projection system based upon the capture image and the appearance of the projected image.

19. The imaging system of claim 15, wherein said controller causes said scene image capture system to capture a calibration image of the projected image and to determine a difference map representing differences between the obtained digital image and the projected image, wherein said difference map is used to adjust the projected image so that the appearance of the projected image more closely approximates the appearance of the received digital image.

20. The imaging system of claim 15, wherein said projection system is connected to the body and, wherein said projection system is connected thereto by way of an interface during periods of cooperation.

* * * * *